United States Patent [19]

Hatanaka et al.

[11] Patent Number: 5,251,200
[45] Date of Patent: Oct. 5, 1993

[54] TRACKING METHOD FOR MEMORY APPARATUS

[75] Inventors: Katsunori Hatanaka, Yokohama; Kunihiro Sakai, Isehara; Hiroyasu Nose, Zama; Kiyoshi Takimoto, Isehara; Yuji Kasanuki, Machida; Yoshihiro Yanagisawa, Isehara; Takahiro Oguchi, Atsugi; Akihiko Yamano; Shunichi Shido, both of Yokohama, all of Japan

[73] Assignee: Canon Kabushiki Kaisha, Tokyo, Japan

[21] Appl. No.: 758,896

[22] Filed: Sep. 11, 1991

[30] Foreign Application Priority Data

Sep. 14, 1990 [JP] Japan ................. 2-242775
May 31, 1991 [JP] Japan ................. 3-157625

[51] Int. Cl.⁵ .............................. G11B 9/00
[52] U.S. Cl. ............................ 369/126; 369/43; 369/47
[58] Field of Search .............. 369/126, 93, 47, 43; 365/151

[56] References Cited

U.S. PATENT DOCUMENTS 4,603,411 7/1986 Sugiyama et al. ............ 369/47

FOREIGN PATENT DOCUMENTS 0174860 3/1986 European Pat. Off. .
0325056 7/1989 European Pat. Off. .
2460083 6/1976 Fed. Rep. of Germany .
57-143743 9/1982 Japan .

OTHER PUBLICATIONS

Jahnke, "Track-Locating and Following Apparatus for a Flexible Disk File," IBM Technical Disclosure Bulletin, vol. 23, No. 2, Jul. 1980, pp. 738-742.

Primary Examiner—Jack I. Berman
Attorney, Agent, or Firm—Fitzpatrick, Cella, Harper & Scinto

[57] ABSTRACT

In an apparatus including a recording medium on which a multiplicity of information bit lines are formed and a probe facing the recording medium, the displacement between the center of the information bit line and the locus of the probe is detected at the time of relatively moving the probe along the information bit line. Tracking is performed in such a manner that the probe scans the center of the information bit line in accordance with the detection results.

14 Claims, 4 Drawing Sheets

TRACKING METHOD FOR MEMORY APPARATUS

BACKGROUND OF THE INVENTION

1. Field of the Invention

The present invention relates to a very high density memory apparatus which employs the principle of an STM (Scanning Tunneling Microscope) which is capable of measuring atomic level irregularities by detecting a tunnel current.

2. Related Background Art

There has been a great desire to realize a technology capable of performing high density recording in the information recording field. The desire of a large capacity memory is the central subject in the electronic industry such as in a computer, its relative equipment and the video disk. Accordingly, many studies have been done to meet the above-described desire.

Hitherto, magnetic recording has been ordinarily employed to record information of a large capacity. Recently, optical recording using laser beams and optomagnetic recording using both laser beams and a magnetic field have become available, causing the recording density to be further improved. Since the optical recording methods require a laser beam having a shorter wavelength in order to further raise the recording density, it is expected that it is very difficult to significantly improve the recording density.

On the other hand, a high resolution microscope called an "STM" (Scanning Tunnel Microscope) capable of directly observing atoms present on the surface of the conductor has been developed [G. Binning et al., Helvetica Physica Acta, 55, 726 (1982)]. As a result, a real spatial image can be observed at a high resolution regardless of whether or not the subject is monocrystal or amorphous. Furthermore, the STM exhibits an advantage in that the subject can be observed at reduced energy while eliminating a risk of damaging the medium by an electric current. In addition, since the STM is able to operate in atmosphere and to be applied to various materials, the STM is expected to be widely used.

The STM is arranged to utilize a fact that a tunnel current flows when a voltage is applied between a probe (a probe electrode) and a conductive material which are caused to come close to each other to a distance of about 1 nm. Since the tunnel current is very sensitive to the change in the distance between the probe electrode and the conductive material, the surface structure of the real space can be drawn by scanning the probe electrode in such a manner that the tunnel current is maintained at a constant value. Simultaneously, various information concerning all electron clouds of the surface atoms can be read out. At this time, the resolution in an in-plane direction is about 1 Å. Therefore, by utilizing the principle of the STM, desired high density recording/reproducing can be performed in the atomic order (several Å). As the recording/reproducing method, a method has been proposed in which the surface status of an appropriate recording layer is changed by using corpuscular beams (electron beams or ion beams), high energy electromagnetic waves such as X-rays or energy beams such as visible or ultraviolet rays to thereby perform recording. Thus, the STM is used to reproduce data. Another method has been proposed in which a material having an effect of memorizing the switching characteristics of an electric current, for example, a conjugate $\pi$ electronic organic compound or a material containing chalcogen is used to form a thin layer so as to perform recording/reproducing by the STM.

By using the above-described recording/reproducing methods, a memory exhibiting an extremely high density and a large capacity can be realized. However, when a great quantity of information is desired to be actually read out, the XY directional (in an in-plane direction of the recording medium) position detection of the probe and correction control (tracking) are required.

The tracking can be performed by a method in which the atomic arrangement of the recording medium is utilized to form the tracking signal to perform scanning with a probe electrode. Another method can be available in which a track is previously formed in the surface of the recording medium. Furthermore, a wobbling method can be employed in which the probe electrode is finely vibrated in the widthwise direction of the information bit line. In particular, the wobbling method is very simple and convenient in comparison to the other methods because the tracking signal can be generated from the reproduced signal of information.

The wobbling method will now be described.

In the wobbling method, when a recorded information bit line is scanned to read a reproduced signal, the probe electrode is stationarily vibrated at a frequency f with an amplitude smaller than the width of the bit line, in a direction perpendicular to the bit line. The frequency f is set to a value sufficiently large with respect to the frequency of the reproduced signal of the bit line. As a result, the amplitude of the reproduce signal of the bit line changes in accordance with the displacement between the probe electrode and the bit column as shown in FIG. 1A. That is, the amplitude intensity of the modulation signal becomes a maximum value when the probe electrode is positioned above the bit line as shown in the graph shown in FIG. 1A. On the contrary, the same is reduced when the probe electrode is moved away from the bit line. When the probe is vibrated finely at the frequency f, the envelope of the reproduced signal of the bit line is, as shown in FIG. 1B, changed as designated by signals b, c and d shown in FIG. 1B depending on the positions shown by the arrows given by same symbols in FIG. 1A. Therefore, by taking the signals denoting the changes in the envelope, signals b', c' and d' shown in FIG. 1B can be obtained. That is, the envelope change signal with respect to vibration waveform a of the probe electrode is reduced as designated by signal c', when the probe electrode is positioned above the bit line as designated by arrow c. When the same is displaced upwards as designated by arrow b, the amplitude is enlarged while the phase is displaced by 180° with respect to the vibration waveform a of the probe electrode. When the same is displaced downwards as designated by arrow d, the amplitude is enlarged with the same phase as that of the vibration waveform a of the probe electrode. Therefore, by performing a phase detection operation using the normal signal of frequency f of the probe electrode as a reference signal, a tracking signal in proportion to the displacement quantity from the bit line can be obtained. As a result, a feedback control in which the probe electrode is maintained at a position above the bit column, can be performed by using the tracking signal.

According to the wobbling method, the wobbling frequency f must be higher than the offtrack frequency component in order to stably perform the tracking. On the contrary, a problem arises in that the S/N of the reproduced signal deteriorates in proportion to the vibration frequency of the probe electrode. That is, there is a contrary relationship between the stability of tracking and the S/N of the reproduced signal [for example, see "Collection of Integrated Technology of Optical Memory and Optomagnetic Memory"(Science Forum, 1983, p. 123) supervised by Yoshifumi Sakurai and Shizuo Tatsuoka].

SUMMARY OF THE INVENTION

Accordingly, an object of the present invention is to provide an information recording apparatus and a method therefor capable of generating tracking information from a reproduced signal without wobbling and scanning an information bit line with high accuracy when a probe electrode is scanned on the information bit line formed on a recording medium.

A detection signal of the probe includes a reproduced signal. The amplitude of the information bit signal component of the detection signal becomes large when the probe correctly tracks the information bit line on the recording medium. On the other hand, the amplitude becomes small when the probe deviates from the information bit line. Therefore, according to an aspect of the present invention, the probe position is controlled in a direction in which the above-described amplitude is, for example, enlarged, whereby tracking can always be correctly performed.

According to another aspect of the present invention, for example, two times of preliminary scanning operations are performed in relation to one signal line upon a reproducing operation. The physical quantity in relation to the recording medium detected by the probe is used to detect the displacement between the central position of the signal line and the preliminary scanning position. Then, the recording/reproducing scanning operation is performed in accordance with the displacement thus-detected.

Other and further objects, features and advantages of the invention will be appear more fully from the following description.

DESCRIPTION OF PREFERRED EMBODIMENTS

A first embodiment of the present invention will now be described with reference to the drawings.

Figure 1A:
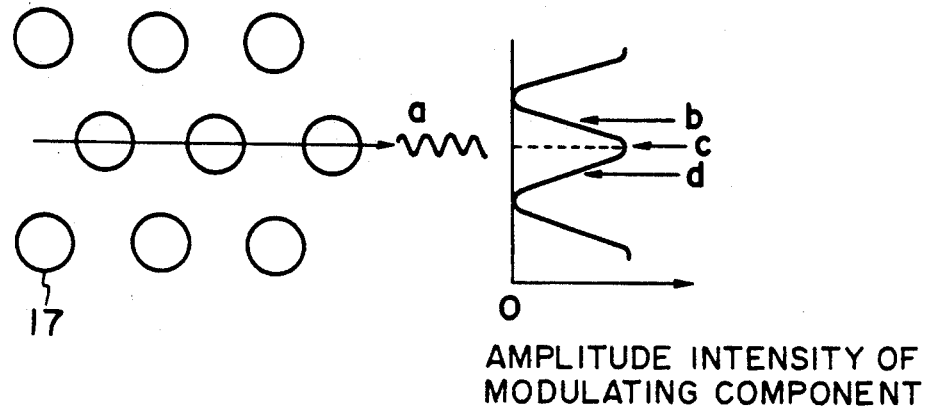
FIGS. 1A and 1B illustrate the signal waveform in a the conventional wobbling operation.
Figure 1B:
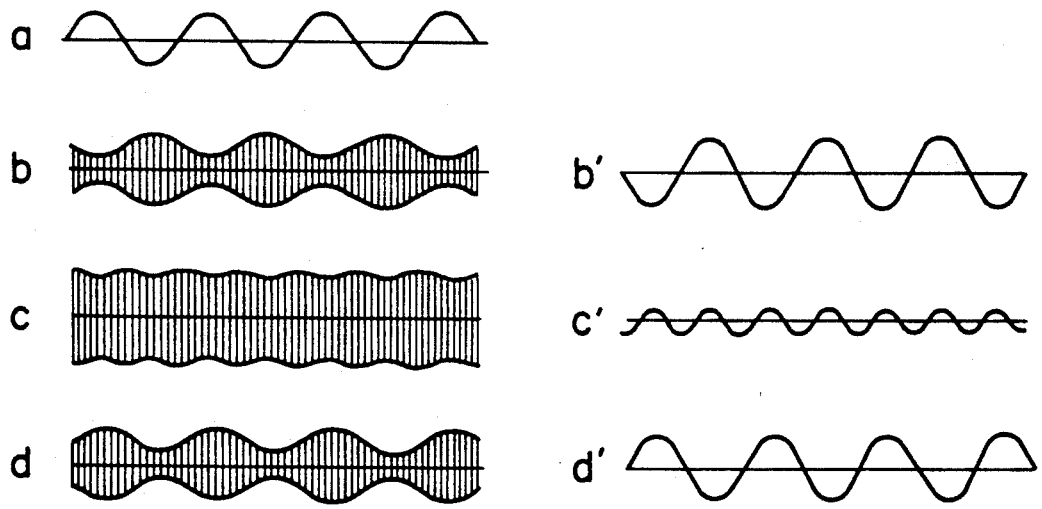
Figure 2:
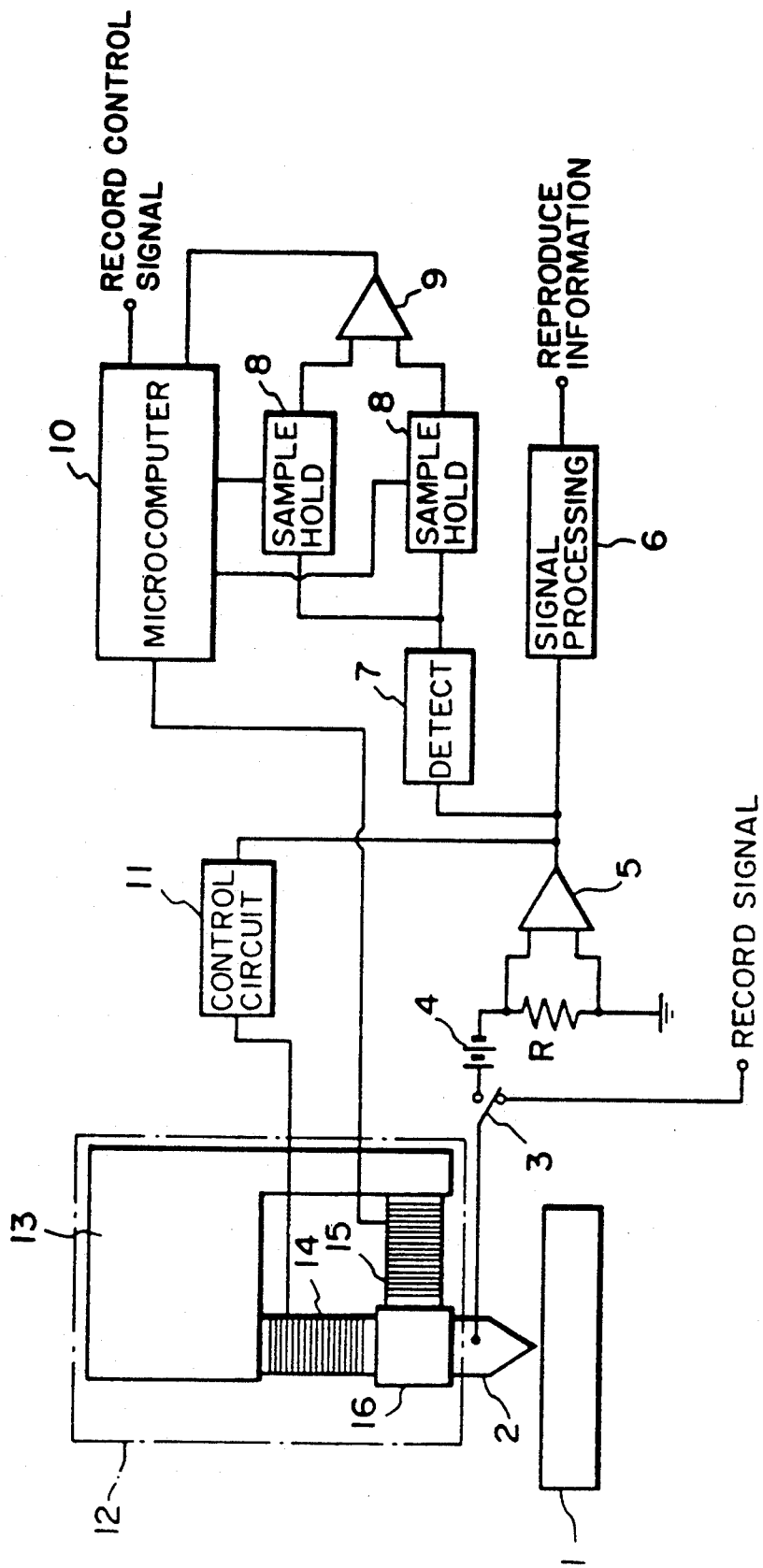
FIG. 2 is a block diagram which illustrates the structure of an apparatus according to a first embodiment of the present invention.

FIG. 2 is a block diagram which illustrates the structure of the first embodiment of a memory apparatus according to the present invention. As shown in FIG. 2, the memory apparatus according to this embodiment comprises: a probe electrode 2; tracking means (not shown) for causing the probe electrode 2 to face the surface of a recording medium having information lines, which has been sequentially recorded as pits and projections on the surface or changes in the electronic states, to relatively travel along the information line; voltage applying means (not shown) for applying voltage between a recording medium 1 and the probe electrode 2 to generate a tunnel current; a bias voltage source 4, a resistor R, an amplifier 5 and a signal processing circuit 6 for converting the tunnel current signal into a voltage signal to reproduce information recorded on the recording medium 1; a detection circuit 7 for detecting the change in the intensity of an envelope signal of the tunnel current signal which has been converted into the voltage signal output from the amplifier 5; two sample hold circuits 8; a comparator 9; a microcomputer 10; and piezoelectric ceramics 15 for finely moving the probe electrode 2 in an intersecting direction (perpendicular direction) in relation to a direction of formation of the information lines on the recording medium 1, on the basis of the result of the detection.

The recording medium 1 is illustrated by its cross section in a direction perpendicular to the record bit line. The recording medium 1 may be made of a material having the current and voltage characteristics which show a memory switching phenomenon, i.e., a material showing a phenomenon of reversible transition in the electrical conductivity, the material being formed on a conductive substrate. The above-described material is exemplified by: an amorphous semiconductor such as oxide glass, borate glass, or chalcogenide glass containing Se, Te or As combined with an element of III, IV, V or VI group of the periodic table; an organic compound having a group with a conjugated $\pi$ electronic level and a group with a $\sigma$ electronic level in the molecules thereof; a coloring matter having a porphin skeleton such as phthalocyanine or tetraphenylporphin; an azulene coloring matter having a squaryllium base and a chroconic base as a bonding chain; a coloring matter like a cyanine in which two heterocycles including nitrogen such as quinoline, benzothiazole and benzo-oxazole are bonded to each other by the squaryllium base and a chroconic base; a cyanine coloring matter, a condensed polycyclic aromatic group such as anthracene and pyrene, a chain compound in which an aromatic cycle and a heterocyclic compound are polymerized with each other, and a polymer of a diacetylene group; a derivative of tetraquinodimethane and diacetylene, its analogous material, its charge-transfer complex; and a metal complex compound such as ferrocene and trisbipyridine ruthenium complex. The above-described material is used in the form of a monomolecular film or a built-up film. It is preferable to employ a so-called Langmuir-Blodgett's (LB) method in which in order to form the monomolecular film or the built-up film of the organic compound an amphipathic material is molecular-oriented at a high density on the water level to form a monomolecular film, the molecular film being then transcribed onto the substrate.

In this embodiment, the recording medium 1 is constituted by laminating a base layer made of Au and a recording layer made of amorphous Si containing hydrogen by 30 atom% on a glass substrate.

The probe electrode 2 has an end portion sharpened as much as possible by etching or electropolishing. In this embodiment, the probe electrode 2 is produced in such a manner that a rod of tungsten having a diameter of 1 mm$\phi$ is mechanically polished to be formed into a conical shape having an angle of 90°, and then an electric field is applied to the same under an ultra high vacuum to evaporate the surface atoms. However, the present invention is not limited to the above-described shape, the producing method and the material of the probe electrode 2.

In order to read out information, the distance from the recording medium 1 to the probe electrode 2 serving as a pickup must be a distance which enables a tunnel current generated due to the tunnel effect to be detected. The distance from the probe electrode 2 to the recording medium 1 and their relative position are controlled by an actuator 12. The actuator 12 comprises a fixed base 13, a movable base 16 and piezoelectric ceramics 14 and 15 such as a PLZT or a PZT. The movable base 16 is connected to the probe electrode 2. When control voltage is applied to the same to extend/contact the piezoelectric ceramics 14 and 15 the probe electrode 2 can be moved in Z direction (vertical direction) or XY direction (lateral direction) with respect to the recording medium 1.

Information can be recorded on the recording medium 1 by using the apparatus thus-constituted in such a manner that a writing pulse voltage having a wave height value of which is 5 V and a pulse width of which is 1 $\mu$sec is applied to the probe electrode 2 to pass the tunnel current to the recording position when a switch 3 is switched on as shown in FIG. 2 and the probe electrode 2 is moved. As a result, record bits having a diameter of each of which is about 10 nm are formed on a straight line at a pitch of 15 nm.

A tracking control to be performed upon a reproducing operation for reading out the signals recorded on the recording medium 1 in the above-described manner will now be described. The switch 3 is switched over to the opposite terminal shown in FIG. 2.

Figure 3A:
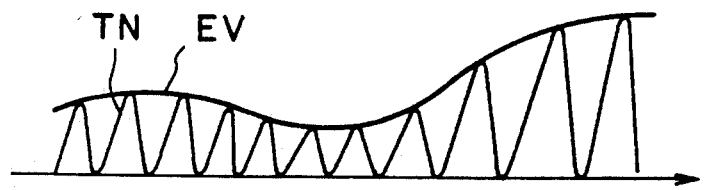
FIGS. 3A and 3B illustrate the waveform of an example of a signal used in the apparatus according to the first embodiment.
Figure 3B:
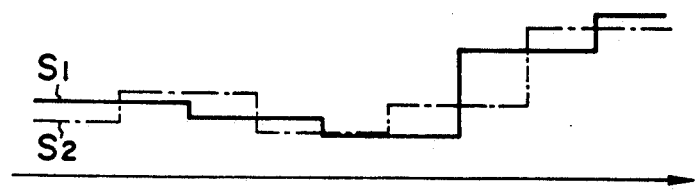

First, the distance from the probe electrode 2 and the recording medium 1 is set in order to obtain the tunnel current in the control circuit 11. By operating the probe electrode 2 along the information bit line formed on the recording medium 1 for the purpose of reading out information, the tunnel current passing through the probe electrode 2 changes in accordance with the record bits (curve TN shown in FIG. 3A). A curve EV shown in FIG. 3A shows the envelope of the above-described tunnel current signal. It can be considered that the increase/decrease of the absolute value of the envelope substantially coincides with the increase/decrease in the amplitude of a signal (information bit signal component) which corresponds to the recording bits. The above-described signal current is I-V transformed through the resistor R and then it is amplified by the amplifier 5. Then, the output from the amplifier 5 is supplied to the signal processing circuit 6 so that reproduction information of "ON" or "OFF" is obtained. The output from the amplifier 5 is also supplied to the detection circuit 7 in which the reproduced signal is envelope-detected before being supplied to the two sample hold circuits 8. Each of the sample hold circuits 8 alternately updates the envelope absolute values by using sample pulses transmitted from the microcomputer 10. Then, the envelope absolute values are sequentially subjected to comparisons by the comparator 9. FIG. 3B illustrates an example of each of outputs $S_1$ and $S_2$ from the corresponding sample hold circuits 8. The result of the comparison is input into the microcomputer 10 to discriminate the direction of the voltage to be applied to the piezoelectric ceramics 15, so that the proper voltage is transmitted to the piezoelectric ceramics 15. That is, the voltage level to be applied is changed, for example, increased to be subjected to a comparison with the next sampling envelope. If the sampling envelope absolute value (level) of the updated circuit is higher than the sampling envelope level of the other circuit, the level of the applied voltage is allowed to increase (if the same is lower, the voltage level is decreased to be subjected to a comparison with the next sampling envelope. Then, until the update side envelope level is decreased in comparison with that of the opposite side sample (until the same is increased in the contrary case) the applied voltage is changed in the same direction, that is, the probe electrode 2 is displaced in the same direction. As described above, the control voltage is applied to the piezoelectric ceramics 15 to control the lateral directional position of the probe electrode 2 so that the envelope level of the reproduced signal becomes the maximum level, whereby the probe electrode 2 is positioned at the most suitable position in the stable state and the tracking can be automatically performed.

For example, the period of the sampling pulse is set to be longer than the period of the information bits, and the voltage displacement per step to be supplied from the microcomputer 10 to the piezoelectric ceramics 15 is set to be 1 nm, whereby the envelope level of the reproduced signal can be brought into a stable state and the tracking can be performed with an accuracy of $\pm 1$ nm.

Although the envelope level is used in the above-described embodiment, another method may be employed in which the amplitude of the information bit signal component is directly detected and the probe position is controlled in the direction in which the amplitude thus-detected is enlarged. Furthermore, tracking may be performed by driving the portion including the recording medium 1.

According to this embodiment tracking information can be generated from the reproduced signal without wobbling. Therefore, an advantage can be obtained in that information can be read out with excellent reproducibility.

A second embodiment of the present invention will now be described.

Figure 4:
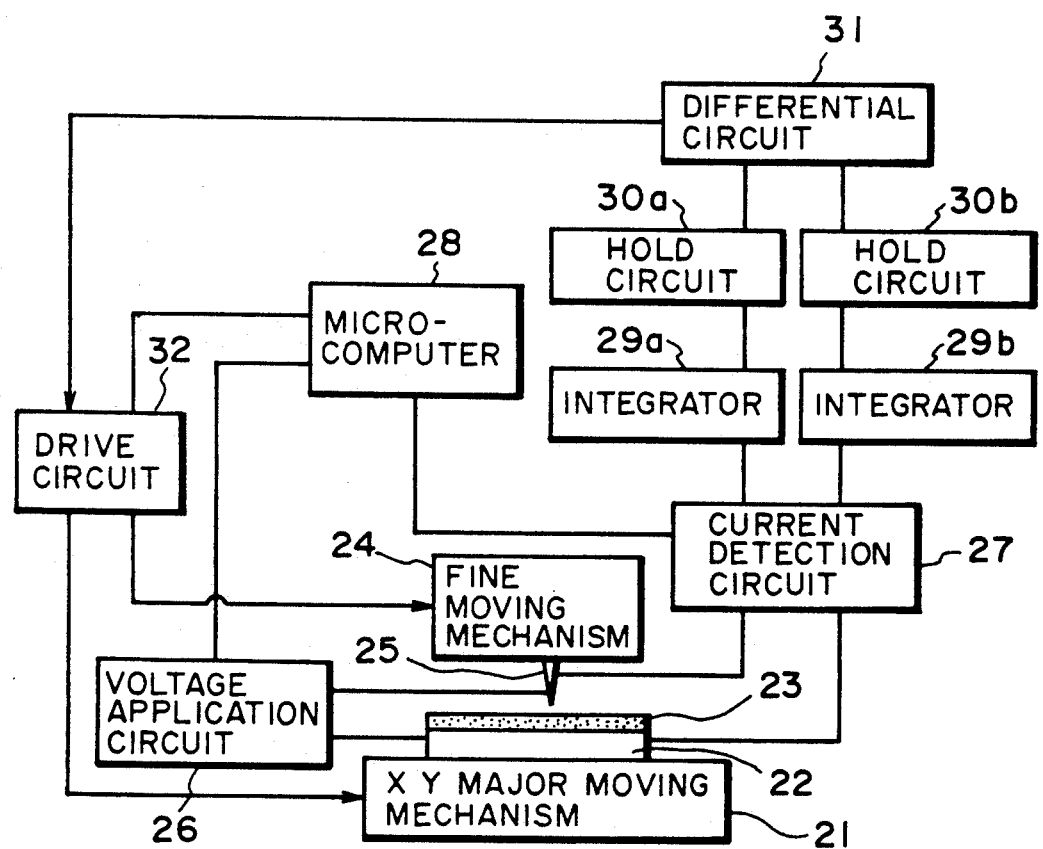
FIG. 4 is a block diagram which illustrates the structure of an apparatus according to a second embodiment of the present invention.

FIG. 4 is a structural view which illustrates a memory apparatus according to this embodiment. A recording medium 23 onto which a base electrode 22 is fixed, is placed on an XY major moving mechanism 21 mainly composed of parallel springs made of elastic hinges and capable of coarsely moving on the XY plane. A probe electrode 25 fixed to a three-dimensional fine moving mechanism 24 made of a piezoelectric element is disposed above the recording medium 23. A voltage application circuit 26 and a current detection circuit 27 are connected to the recording medium 23 and the probe electrode 25. The voltage application circuit 26 and the current detection circuit 27 are connected to a microcomputer 28. The output from the current detection circuit 27 is transmitted to integrators 29a and 29b. The outputs from the integrators 29a and 29b are transmitted to a differential circuit 31 through hold circuits 30a and 30b, respectively. The output from the differential circuit 31 is transmitted to a drive circuit 32 which is connected to the XY major moving mechanism 21, the 3-D fine moving mechanism 24 and the microcomputer 28.

The probe electrode 25 may be used in which the edge portion of a pin of tungsten, Pt-Ir, Pt, or the like is mechanically polished and then is electrolytically polished. The recording medium 23 is produced in such a manner that a material similar to those in the first embodiment having a memory effect in relation to switching characteristics of the voltage current is used in, for example, the Langmuir's-Blodgetts (LB) method so that four layers of squaryllium-bis-6-octyl azulene are formed on a graphite substrate.

At the time of the recording operation and the reproducing operation, the XY major moving mechanism 21 and the 3-D fine moving mechanism 24 are driven by the microcomputer 28 and the drive circuit 32, so that the positional relationship between the recording medium 23 and the probe electrode 25 is coarsely set.

At the time of the recording operation, the XY major moving mechanism 21 and the 3-D fine moving mechanism 24 are driven by the drive circuit 32, so that the probe electrode 25 is relatively scanned above the surface of the recording medium 23. Then, the pulse voltage is applied between the probe electrode 25 and the recording medium 23 by the voltage application circuit 26. As a result, portions having different electric resistance levels are locally created on the surface of the recording medium 23 to perform recording.

At the time of the reproducing operation, the tracking control is performed in a method to be described later while a constant voltage is applied to such a degree that the tunnel current flows between the probe electrode 25 and the recording medium 23, so that the data lines formed on the recording medium 23 are scanned by the probe electrode 25. The tunnel current obtained at the above-described scanning operation is detected by the current detection circuit 27. Then, the 3-D fine moving mechanism 24 is driven by the drive circuit 32 so that the average value of the tunnel current becomes a substantially constant value, whereby the probe electrode 25 is vertically moved. Since the distance of the vertical movement at this time corresponds to recorded information, reproducing data is generated in accordance with the distance of the vertical movement.

Figure 5:
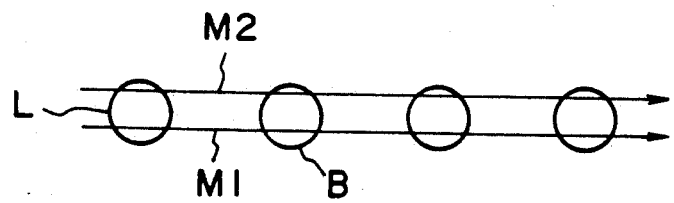
FIG. 5 illustrates the locus of preliminary scanning on a signal line.

The tracking control method will now be described. The signal line is preliminarily scanned two times for tracking the signal line. The detection signal obtained by the preliminary scanning is used to perform third recording/reproducing tracking. FIG. 5 illustrates a signal line L, first and second preliminary scanning loci M1 and M2. The two times of preliminary scanning operations are performed in parallel at an interval smaller than the diameter of recording bit B of the signal line L so that the two preliminary scanning loci M1 and M2 pass on the signal line L. The tunnel currents detected by the current detection circuit 27 at the time of the first and second preliminary scanning operations are integrated by integrators 29a and 29b, respectively. The integration results Ia and Ib are held by hold circuits 30a and 30b. When the second preliminary scanning operation has been completed, the differential output denoting the difference (Ia−Ib) between the integration results obtained by the differential circuit 31 is transmitted to the drive circuit 32.

Figure 6:
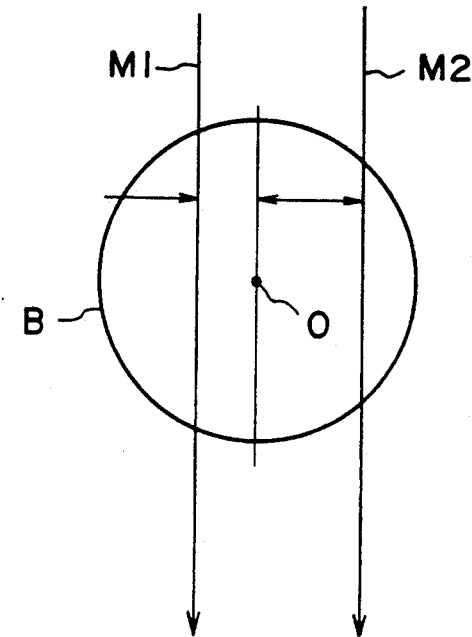
FIG. 6 illustrates the locus of preliminary scanning on a record bit.
Figure 7:
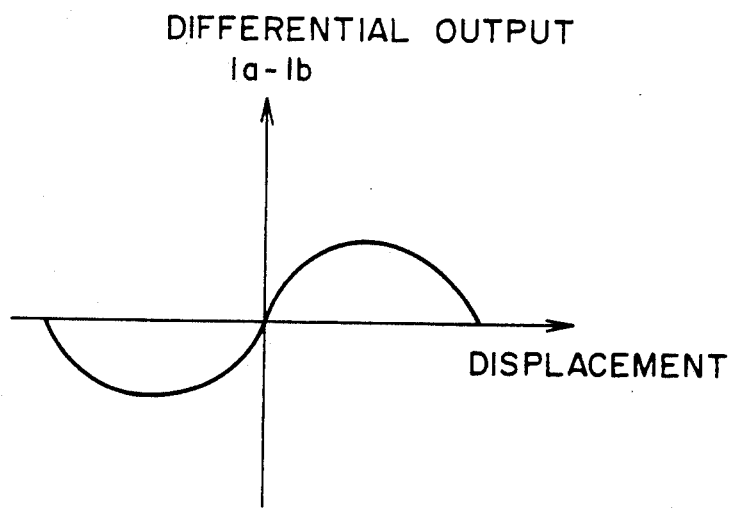
FIG. 7 is a graph which illustrates the relationship between the amounts of the displacements of preliminary scanning and operating output values.

FIG. 6 illustrates an example of each of the two preliminary scanning loci M1 and M2. FIG. 7 illustrates the relationship between the displacement of the preliminary scanning loci M1 and M2 in relation to the record bit B and the differential output from the differential circuit 11. In a case when the distance from center O of the record bit B to the preliminary scanning locus M1 is equal to the preliminary scanning locus M2, the integration results Ia and Ib become equal. Therefore, the differential output becomes 0. If the intermediate position between the two preliminary scanning loci M1 and M2 is displaced to the right with respect to the record bit B, the integration result Ia increases and the integration result Ib decreases. As a result, the differential output increases. If the intermediate position is displaced to the left, the integration Ia decreases and Ib increases.

Since the interval between the two preliminary scanning loci M1 and M2 is a known value, the displacement between the intermediate position between the two preliminary scanning loci M1, M2 and the center O of the actual record bit B can be detected from the differential output. By performing the third tracking scan in accordance with the displacement thus-detected, the probe electrode 25 can be controlled so as to pass near the central position of the signal line L. The hold circuits 30a and 30b are reset before the next pre-scanning operation is performed, so that the influence of the previous scanning operation can be eliminated.

The number of times of the preliminary scanning operations to be performed is not limited to two times. The pre-scanning operations may be performed plural times, for example, three or more times. Also, the present invention can be adapted to an apparatus capable of performing only the recording operation or that capable of performing only the reproducing operation.

As described above, the tracking method according to this embodiment is arranged in such a manner that one signal line is subjected to, for example, two times of preliminary scanning operations at the time of the reproducing operation. The physical quantity of the recording medium detected by the probe is used to detect the displacement between the central position of the signal line and the preliminary scanning position. Since the recording/reproducing scanning operation is performed in accordance with the displacement thus-detected, the tracking accuracy can be improved and the S/N ratio at the time of the reproducing operation can be improved. Furthermore, the reliability of the reproduced signal can be improved.

Although the invention has been described in its preferred form with a certain degree of particularity, it is understood that the present disclosure of the preferred form may be changed in the details of construction and the combination and arrangement of parts may be resorted to without departing from the spirit and the scope of the invention as hereinafter claimed.

What is claimed is:

1. A method for reproducing information recorded onto a recording medium by using a probe, said method comprising the steps of:
    detecting at least one of an increase and a decrease in an amplitude of a signal in an information bit obtained by scanning the probe along an information bit line formed on the recording medium, the probe facing the recording medium; and
    relatively displacing the probe in a direction intersecting the direction in which the information bit line is formed on the recording medium so that the amplitude increases.

2. A method according to claim 1, wherein said detecting step comprises detecting a state of an envelope of the signal.

3. A memory apparatus comprising:
a recording medium;
a probe facing said recording medium;
detection means for detecting at least one of an increase and a decrease in an amplitude of a signal in an information bit obtained by scanning said probe along an information bit line formed on said recording medium; and
moving means for relatively displacing said probe in a direction intersecting the direction in which the information bit line is formed on said recording medium so that the amplitude increases.

4. A memory apparatus according to claim 3, wherein said detection means comprises means for detecting a state of an envelope of the signal.

5. A memory apparatus according to claim 3, wherein said recording medium has a memory effect due to a change in electrical conductivity.

6. A memory apparatus according to claim 3, further comprising means for applying a voltage between said probe and said recording medium.

7. A memory apparatus according to claim 5, wherein a tunnel current passes between said probe and said recording medium.

8. A method for reproducing information recorded onto a recording medium by using a probe, said method comprising the steps of:
performing preliminary scanning, by relatively moving the probe along an information bit line formed on the recording medium, prior to reproducing the information, and producing a scanning detection signal;
detecting a displacement between a center of the information bit line and a locus of the preliminary scanning from the scanning detection signal obtained by the preliminary scanning; and
scanning the center of the information bit line in accordance with the result of said detecting step to reproduce information from the recording medium.

9. A method according to claim 8, further comprising performing said preliminary scanning step plural times at an interval smaller than a size of the bit.

10. A memory apparatus comprising:
a recording medium;
a probe facing said recording medium;
means for performing preliminary scanning, by relatively moving said probe along an information bit line formed on said recording medium, prior to reproducing information from said recording medium, and for producing a scanning detection signal;
detection means for detecting a displacement between a center of the information bit line and a locus of the preliminary scanning from the scanning detection signal produced by said means for performing preliminary scanning, and for producing a displacement detection signal; and
scanning means for scanning the center of the information bit line in accordance with the displacement detection signal to reproduce information from said recording medium.

11. A memory apparatus according to claim 10, wherein the preliminary scanning is performed by said means for performing preliminary scanning plural times at an interval smaller than a size of the bit.

12. A memory apparatus according to claim 10, wherein said recording medium has a memory effect due to a change in electrical conductivity.

13. A memory apparatus according to claim 10, further comprising means for applying voltage between said probe and said recording medium.

14. A memory apparatus according to claim 13, wherein a tunnel current passes between said probe and said recording medium.

* * * * *